United States Patent
Ito et al.

(10) Patent No.: US 6,379,802 B2
(45) Date of Patent: *Apr. 30, 2002

(54) THERMOPLASTIC SKIN SHEET FOR INTERIOR PARTS OF AUTOMOBILES AND METHOD FOR PRODUCING SUCH SKIN SHEET

(75) Inventors: Sukekuni Ito; Keiichi Honjo, both of Saitama-ken; Masami Imada, Ibaraki-ken; Manabu Kudoh, Chiba-ken, all of (JP)

(73) Assignees: Honda Giken Kogyo Kabushiki Kaisha, Tokyo; Tokusho Shikiryo Color & Chemicals, Inc., Chiba-Ken, both of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 2 days.

(21) Appl. No.: 09/337,498

(22) Filed: Jun. 22, 1999

(30) Foreign Application Priority Data

Jun. 22, 1998 (JP) ............................................ 10-175186
Jun. 22, 1998 (JP) ............................................ 10-175187

(51) Int. Cl.$^7$ .............................................. B32B 27/40
(52) U.S. Cl. ................................ 428/424.2; 428/423.1; 428/500; 428/509; 428/515; 428/517; 525/66; 525/67
(58) Field of Search ...................... 525/66, 67; 428/500, 428/509, 513, 516, 517, 423.1, 429.2

(56) References Cited

U.S. PATENT DOCUMENTS 5,407,991 A * 4/1995 Hisaka et al. ................ 524/491
5,821,301 A * 10/1998 Tsuneka et al. ................ 525/64

FOREIGN PATENT DOCUMENTS

| JP | 63-19287 | 7/1986 |
| JP | 60-197741 | 3/1994 |
| JP | 63-272547 | 12/1997 |

OTHER PUBLICATIONS

Abstract of Japanese Patent Publication No. 7–14655 (which Inventors advise is the same as Japanese Patent laid–Open No. 63–19287), (No date).
Abstract of Japanese Patent No. 2,533,147 (which Inventors advise is the same as Japanese Patent Laid–Open No. 63–272547), (No date).

* cited by examiner

*Primary Examiner*—Blain Cophenheaver
*Assistant Examiner*—Christopher Paulraj
(74) *Attorney, Agent, or Firm*—Sughrue, Mion, Zinn, Macpeak & Seas, PLLC

(57) ABSTRACT

A thermoplastic skin sheet constituted by (a) a thermoplastic polyolefin or elastomer sheet; (b) a primer layer coated on the sheet, the primer being based on a modified polyolefin resin containing 2 mg-equivalent/g or less of a hydroxyl group or a carboxyl group; and (c) a topcoat layer coated on the primer layer. The topcoat layer may be mainly composed of (a) 100 parts by weight of a polycarbonate polyurethane resin having a number-average molecular weight of 8,000 or more and a 100% modulus of 20 kg/cm$^2$ or more, and (b) 0.1–40 parts by weight of a (meth)acrylate-butadiene-styrene resin. The surface of the topcoat layer may be subjected to embossing.

5 Claims, No Drawings

THERMOPLASTIC SKIN SHEET FOR INTERIOR PARTS OF AUTOMOBILES AND METHOD FOR PRODUCING SUCH SKIN SHEET

BACKGROUND OF THE INVENTION

The present invention relates to a thermoplastic skin sheet used for interior parts of automobiles, more particularly to a thermoplastic skin sheet suffering from no cracking and rupture by thermal forming, and to a thermoplastic skin sheet with a matte surface suitable for decorative skin sheets for interior parts of automobiles, and their production method.

Interior parts of automobiles such as instrument panels should not only be integrally formed into complicated shapes but also have good hand such as softness, elasticity, etc., with matte surfaces such as embossed surfaces. For this purpose, a foamed layer is conventionally disposed between a substrate sheet and a surface skin layer for interior parts of automobiles such as instrument panels, and a surface of the skin layer is subjected to embossing or matte coating.

Conventional interior parts have skin sheets made of polyvinyl chloride resins from the aspect of hand, wear resistance, weathering resistance, etc., and inner foam layers mostly constituted by polyurethane foams. Substrate sheets for the conventional interior parts are made of polypropylene, ABS resins, etc., from the aspect of formability, mechanical strength, etc. Because conventional interior pan having such laminate structures are formed by different resins, the interior parts should be separated depending on the types of resins for the purpose of recycling. However, it is not easy to conduct the separation of polyvinyl chloride resin skin layers from the substrate sheets made of ABS resins or polypropylene, which are bonded to each other via polyurethane foam layers. In addition, cross-linked, foamed polyurethane layers cannot be recycled. Further, because environmentally toxic gas is generated by burning the polyvinyl chloride resins, the polyvinyl chloride resins should be burned in large-scale incinerators equipped with toxic gas-removing means. As a result, the interior parts of automobiles are actually pulverized to fine particles, which are then discarded as dust in dumpsites.

In view of recent concern about industrial waste problems and the environment, recycling the interior parts is strongly desired to decrease waste generated from automobiles, and such recycling is partly put into practical use. For the purpose of recycling, each layer is desirably made of the same resin, particularly polyolefin resins. However, because the skin layers of the interior parts made of a polyolefin resins are poor in coatability, the skin layers should be coated with primers or subjected to corona discharge treatment. It is also common from the viewpoint of productivity. to prepare a skin sheet with a surface coating, adhere a polypropylene foam and a substrate sheet to the skin sheet, and subject the resultant laminate to vacuum forming.

Known as primers for skin sheets made of thermoplastic polyolefin resins are chlorinated polypropylene paints, reactive paints containing saturated polyesters and polyisocyanates. Proposals have been made to apply a reactive paint containing a saturated polyester and a polyisocyanate to a surface of a skin sheet coated with a chlorinated polypropylene primer or a surface of a skin sheet subjected to a corona discharge treatment, and apply a paint containing a saturated polyester, acrylic resin, etc., and a optionally polyisocyanate or a polyurethane paint as a topcoat.

Specifically, for instance, Japanese Patent bid-Open No. 60-197741 discloses a method for producing a sheet usable as skin sheets of instrument panels, etc., among the interior parts of automobiles, comprising forming a sheet from a material containing a polyolefin resin such as polypropylene and partially cross-linked ethylenes-α-olefin copolymers, and coating a surface of this sheet with a reactive paint containing a saturated polyester resin, an acrylate resin, and an isocyanate resin.

Japanese Patent Publication No. 7-14655 discloses a method for producing a printed composite skin sheet for use in ceilings, door rims, etc., of automobiles, comprising applying a chlorinated polypropylene primer to one surface of a skin sheet made of thermoplastic elastomers such as polypropylene elastomers, printing the primer-coated surface with an ink composition comprising an acrylic resin, a saturated polyester resin and an ink, and integrally fusing the resultant printed skin sheet made of thermoplastic elastomers to one or both surfaces of a pad composed of a polypropylene foam.

Further, Japanese Patent 2,533,147 discloses a thermoplastic elastomer article formed by coating a thermoplastic elastomer formed product with a primer containing at least one compound selected from a saturated polyester and a chlorinated polyolefin, and coating the resultant primer layer with a topcoat comprising at least one compound selected from a saturated polyester, an acrylate resin, a polyvinyl chloride resin and an isocyanate resin (the topcoat includes at least an acrylate resin if the primer layer consists only of a saturated polyester), the thermoplastic elastomer formed product comprising (I) 100–30 parts by weight of partially cross-linked copolymer rubber composition obtained by kinetically heat-treating a mixture of (a) 90–20 parts by weight of an ethylene-α-olefin copolymer rubber, (b) 10–80 parts by weight of a polyolefin resin, (a)+(b) being 100 parts by weight, and optionally (c) a hydrocarbon rubber material not crosslinkable with peroxide, and (d) 0–200 parts by weight of a mineral oil softening agent, in the presence of a cross-linking agent; and (II) 0–70 parts by weight of a polyolefin resin, (I)+(II) being 100 parts by weight.

However, any of the above conventional skin sheets are disadvantageous in that they suffer from cracking and rupture on the surface when thermally formed into desired shapes. Recently spray coating is widely used to improve the appearance of formed products, but such spray coating aggravates the above phenomenon. Further, the use of chlorinated polyolefin resins such as chlorinated polypropylene as primers in Japanese Patent Laid-Open No. 60-197741 and Japanese Patent Publication No. 7-14655 not only deteriorates the resistance of the skin sheets to hydrocarbon solvents such as petroleum benzene, gasoline, etc., but also causes remarkable thermal discoloration of the skin sheets over a long period of use.

In addition, reactive primers containing saturated polyesters and polyisocyanates disclosed in Japanese Patent Laid-Open No. 60-197741 and Japanese Patent 2,533,147 cause problems that a surface of a thermoplastic skin sheet should be subjected to an oxidation treatment such as a corona discharge treatment, etc., making the entire process too lengthy; and that a mixture of a polyester and a polyisocyanate cannot be stored for a long period of time due to its reactivity, making impossible its reuse later and thus making it inevitable to discard all remaining primer liquids.

As a result of research in view of the above problems, the inventors have found the following facts:

(1) With respect to solvent resistance, the chlorinated polypropylene per se is easily eroded by hydrocarbon solvents.

(2) With respect to thermal discoloration, chlorine gas or hydrochloride gas generated by thermal decomposition of the chlorinated polypropylene causes the thermal discoloration.

(3) The reason why the corona discharge treatment is necessary in using reactive primers containing saturated polyesters and polyisocyanates is that the primers would not adhere to surfaces of thermoplastic sheets made of thermoplastic polyolefin resins or thermoplastic elastomers unless polar groups such as hydroxyl group reactive to isocyanate components in the primers are generated.

(4) The reason why the remaining primer liquids cannot be stored for a long period of time is that isocyanate components in the primers containing saturated polyesters and polyisocyanates react with the remaining hydroxyl groups in the saturated polyesters and moisture in the air with time, whereby the isocyanate components become unreactive to polar groups on the surfaces of thermoplastic sheets made of thermoplastic polyolefin resins or thermoplastic elastomers.

OBJECT AND SUMMARY OF THE INVENTION

Accordingly, a first object of the present invention is to provide a thermoplastic skin sheet capable of being thermally stretch-formed substantially without causing cracking and rupture, thus being suitable for interior parts of automobiles which are formed at high stretching ratio.

A second object of the present invention is to provide a skin sheet for interior parts of automobiles exhibiting excellent solvent resistance without thermal discoloration, which does not necessitate a surface oxidation treatment such as a corona discharge treatment, and a method for producing such a skin sheet.

With respect to the first object, the inventors have paid attention to the fact that the conventional topcoats and reactive primers cannot undergo drastic thermal stretching of the thermoplastic polyolefin or elastomer substrate sheet without causing cracking and fracture, and that to avoid the above problem, a topcoat which can fully allow drastic stretching should be coated on the thermoplastic polyolefin or elastomer substrate sheet via an unreactive olefinic primer. As a result, by coating a topcoat based on a polycarbonate polyurethane resin and containing a (meth)acrylate-butadiene-styrene resin on a thermoplastic polyolefin or elastomer sheet via a modified polyolefin primer free from chlorine, the thermoplastic polyolefin or elastomer sheet can show extremely improved tensile strength and rupture elongation when thermally formed so that it may be used suitably for thermoplastic skin sheets.

The inventors also have conducted research on primers and topcoats applied to thermoplastic sheets in view of the above second object, resulting in finding that a one-liquid-type primer comprising an unreactive primer free from chlorine should be used to solve the above problems in solvent resistance, thermal discoloration, and reuse, etc.

Thus, the thermoplastic skin sheet according to the first embodiment of the present invention comprises a thermoplastic sheet made of a thermoplastic polyolefin resin or a thermoplastic elastomer, a modified polyolefin primer layer free from chlorine coated on the sheet, and a topcoat layer coated on the primer layer, the topcoat layer mainly comprising 100 parts by weight of a polycarbonate polyurethane resin having a number-average molecular weight of 8,000 or more and a 100% modulus of 20 kgf/cm$^2$ or more, and (b) 0.1–40 parts by weight of a (meth)acrylate-butadiene-styrene resin.

In the first embodiment, by applying an unreactive modified polyolefin primer free from chlorine to a thermoplastic sheet made of a thermoplastic polyolefin resin or a thermoplastic elastomer, and further by applying a topcoat based on a vehicle which is a mixture of 100 parts by weight of a polycarbonate polyurethane resin having a number-average molecular weight of 8,000 or more and a 100% modulus of 20 kgf/cm$^2$ or more and 0.1–40 parts by weight of a (meth)acrylate-butadiene-styrene resin, the thermoplastic skin sheet can easily be thermally stretched without causing cracking and rupture. The reasons therefor are not necessarily clear, but it may be considered that the polycarbonate polyurethane resin is sufficiently stretchable, and the (meth)acrylate-butadiene-styrene resin imparts mechanical strength and elasticity to the thermoplastic polyolefin or elastomer skin sheet, thereby improving the stretching of the skin sheet substantially without causing cracking and rupture.

The thermoplastic skin sheet according to the second embodiment of the present invention comprises (a) a thermoplastic elastomer sheet; (b) a primer layer coated on the sheet, said primer being based on a modified polyolefin resin containing 2 mg-equivalent/g or less of a hydroxyl group or a carboxyl group; and (c) a topcoat layer coated on the primer layer, a surface of the topcoat layer being subjected to embossing.

The polyolefin resins for the primer are preferably modified polypropylene formed by random-, block- or graft-copolymerization of propylene or polypropylene with unsaturated esters or ethers having hydroxyl groups or carboxyl groups or unsaturated carboxylic acids or their anhydrides. Also, the thermoplastic elastomers are preferably blends of crystalline polypropylene and olefinic elastomers.

The method for producing the thermoplastic skin sheet of the second embodiment comprises the steps of coating a thermoplastic elastomer sheet with a primer based on a modified polyolefin resin containing 2 mg-equivalent/g or less of a hydroxyl group or a carboxyl group; coating the resultant primer layer with a topcoat; and then embossing a surface of the resultant topcoat layer at 190° C. or higher.

In the second embodiment, by coating a topcoat on a thermoplastic sheet via a primer based on modified polypropylene containing a hydroxyl group or a carboxyl group, the topcoat is thermally fused to the thermoplastic sheet integrally via the primer layer by embossing at 190° C. or higher, making it unnecessary to conduct a surface oxidation treatment such as a corona discharge treatment on the thermoplastic sheet before coating the primer. Also, because any layers do not contain chlorine, the finished skin sheets are free from thermal discoloration, showing excellent solvent resistance.

DETAILED DESCRIPTION OF THE PREFERRED EMBODIMENTS

[1] Layer structure of skin sheet

The skin sheet has a layer structure of a substrate sheet made of thermoplastic polyolefin resins or thermoplastic elastomers, a primer layer and a topcoat layer. Each layer will be explained in detail below.

(A) Substrate sheet (1) Composition (a) Thermoplastic polyolefin sheet

The thermoplastic polyolefin resin may be made of polypropylene resins such as polypropylene, propylene-ethylene copolymers, etc.

The polypropylene resins may be not only homopolymers of propylene but also copolymers of propylene and other α-olefins. The α-olefins include ethylene, 1-butene, 1-pentene, 1-hexene, 4-methyl-1-pentene, etc. Among the propylene-α-olefin copolymers, a propylene-ethylene copolymer is preferable. The ethylene content in the propylene-ethylene copolymer is preferably 40 weight % or less. When the ethylene content exceeds 40 weight %, the sheet has decreased mechanical strength. The polypropylene resins preferably have a melt flow rate (MFR, 230° C., 2.16 kg load, JIS K7210) of about 5–100 g/10 min.

(b) Thermoplastic elastomer sheet

The thermoplastic elastomers used in the present invention are preferably blends of crystalline polyolefins and olefinic elastomers. The crystalline polyolefins may be polypropylene, propylene-ethylene copolymers, etc. as described above.

The olefinic elastomers are preferably elastomers formed by copolymerizing two or more monoolefins such as ethylene, propylene, 1-butene, 1-pentene, 1-hexene, 4-methyl-1-pentene, etc., and optionally diolefins such as ethylidene norbornene, 1,4-hexadiene, dicyclopentadiene, etc. Specific examples of such olefinic elastomers are ethylene-propylene rubber (EPR), ethylene-butene rubber (EBR), ethylene-propylene-diene terpolymer (EPDM), etc. The olefinic elastomers preferably has an ethylene content of 30–80 weight %, an iodine value (degree of unsaturation) of 30 or less and a Moony viscosity $ML_{1+8}$ (127° C.) of about 10–200. Such olefinic elastomers usually have a crystallinity of 40% or less.

To have excellent mechanical strength, good softness and elasticity, the thermoplastic elastomers are preferably composed of polypropylene resins and olefinic elastomers. A weight ratio of the polypropylene resin to the olefinic elastomer is preferably about 5/95–80/20. When the polypropylene resin is 5 weight % or less (the olefinic elastomer exceeds 95 weight %), the sheet has decreased mechanical strength. On the other hand, when the polypropylene resin exceeds 80 weight % (the olefinic elastomer is less than 20 weight %), the sheet has poor elasticity.

(c) Additives

The thermoplastic polyolefins or elastomers may contain antioxidants, ultraviolet absorbers, antistatic agents, flame retardants, pigments, and inorganic fillers such as talc, calcium sulfate, barium sulfate, mica, calcium silicate, etc.

(2) Cross-linking

To provide good mechanical strength, heat resistance, durability, weathering resistance, wear resistance, impact resistance, etc. to the thermoplastic polyolefin or elastomer sheet, the thermoplastic polyolefin or elastomer sheet is preferably partially crosslinked. For this purpose, it is preferable to add a peroxide cross-linking agent such as dicumyl peroxide, 2,5-dimethyl-2,5-di(t-butyl peroxy)hexyne-3, t-butylcumyl peroxide, etc. The amount of the peroxide cross-linking agent added is preferably about 0.01–0.05 parts by weight of per 100 parts by weight of the polypropylene resin and/or the olefinic elastomer. A cross-linking aid may also be added.

(3) Thickness

The thermoplastic polyolefin or elastomer sheet preferably has a thickness of 0.3 mm or more, more preferably 0.4–0.8 mm. When the thermoplastic sheet is as thin as less than 0.3 mm, it has insufficient mechanical strength, durability, etc., making it difficult to prevent the sheet from having defects such as surface undulation, etc. when subjected to a subsequent vacuum forming step.

(B) Primer layer (1) Composition

The primer is preferably based on a modified polyolefin resin free from chlorine, to which 2 mg-equivalent/g or less of a hydroxyl group or a carboxyl group is added. To introduce a hydroxyl group or a carboxyl group into the polyolefin resin, any methods such as a solution polymerization method, a suspension polymerization method, an emulsion polymerization method, melt blending method in the presence of peroxides, etc. may be used. The modified polyolefin may be a random copolymer, a block copolymer or a graft copolymer. Preferable among them is a graft copolymer having a basic structure of $-[CH_2-CH(CH_3)]_m-[CH_2-CX(CH_3)]_n-$, wherein X is a hydroxyl group or a carboxyl group, m and n respectively represent the number of each structure unit.

The graft copolymer into which a hydroxyl group is introduced can be prepared by melt-blending polypropylene with an unsaturated ester or ether having a hydroxyl group in the presence of peroxide. Also, the graft copolymer into which a carboxyl group is introduced can be prepared by melt-blending polypropylene with an unsaturated carboxylic acid or its anhydride in the presence of peroxide.

To introduce a hydroxyl group, it is preferable to use hydroxyl group-containing (methacrylates such as hydroxymethyl (meth)acrylate, hydroxyethyl (meth)acrylate, hydroxybutyl (meth)acrylate, N-methylol acrylamide, etc., and 2-hydroxyethyl (meth)acrylate is particularly preferable. To introduce a carboxyl group, it is preferable to use an unsaturated carboxylic acid or its anhydride. The unsaturated carboxylic acids or anhydrides thereof include monocarboxylic acids such as acrylic acid, methacrylic acid, etc.; dicarboxylic acids such as maleic acid, fumaric acid, itaconic acid, etc.; dicarboxylic anhydrides such as maleic anhydride, itaconic anhydride, etc.

The amount of a hydroxyl group or a carboxyl group added is preferably 2 mg-equivalent/g or less, because such amount is sufficient. Even if a hydroxyl group or a carboxyl group is added in an amount exceeding 2 mg-equivalent/g, further improvement of effects cannot be achieved, only resulting in increase in production cost. The more preferred amount of a hydroxyl group or a carboxyl group added is 0.5–1.5 mg-equivalent/g.

The polyolefin resins, to which a hydroxyl group or a carboxyl group is to be added, are preferably polymers based on polypropylene, though they may contain other comonomers such as ethylene, etc.

Primers based on modified polyolefin resins containing a hydroxyl group or a carboxyl group are commercially available under the tradenames of AD-456M (manufactured by Tokushu Shikiryo Kogyo K. K.), Unistol P-801, P-401 (manufactured by Mitsui Chemical), etc.

(2) Coated amount

The amount of the primer coated is preferably 10–100 g/m² on a wet basis. When the amount of the primer coated is less than 10 g/m², sufficient adhesion cannot be achieved between the thermoplastic polyolefin or elastomer sheet and the topcoat. On the other hand, more than 100 g/m² of the primer is meaningless. Because the thickness of the primer is reduced to about 1/10 when dried, the dry thickness of the primer is about 1–10 g/m².

(C) Topcoat layer (1) Composition

In the first embodiment, the resins for the topcoat paint may be a combination of a polycarbonate polyurethane resin and a (meth)acrylate-butadiene-styrene resin. In the second embodiment, they may also be polyesters, acrylic resins, polyisocyanates, etc.

(1) First embodiment (a) Polycarbonate polyurethane resin

The polycarbonate polyurethane resin is formed by reacting an isocyanate group of an isocyanate compound to an end hydroxyl group of polycarbonate diol. The polycarbonate polyurethane resin has a number-average molecular weight of 8,000 or more, and a 100% modulus of 20 kgf/cm² or more.

The polycarbonate diols may be prepared by a transesterification reaction of low-molecular weight diols and dialkyl carbonates such as dimethyl carbonate. The low-molecular weight diols may be aliphatic diols such as 1,4-butane diol, 1,6-hexane diol, etc.; alicyclic diols such as 1,4-cyclohexane diol, etc. Commercially available polycarbonate diols are Desmophen D-2020E (manufactured by Bayer), etc.

The isocyanate compounds may be aliphatic polyisocyanates such as hexamethylene diisocyanate (HMDI); alicyclic polyisocyanates such as isophorone diisocyanate (IPDI); aromatic polyisocyanates such as hydrogenated diphenyl diisocyanate, diphenylmethane-4,4'-diisocyanate (MDI), hydrogenated MDI, etc. In any cases, non-yellowing polyisocyanates are preferable.

The polycarbonte polyurethane resin may be prepared by reacting a polycarbonate diol formed by the transesterification of a low-molecular weight diol and a dialkyl carbonate with an isocyanate compound at a molar ratio of 1:1–1:2.

The polycarbonate polyurethane resin has a number-average molecular weight of 8,000 or more. When the number-average molecular weight is less than 8,000, the resultant topcoat has insufficient mechanical strength, wear resistance, weathering resistance, heat resistance, durability, etc. The more preferred number-average molecular weight is 10,000–50,000. To make the topcoat usable for high-temperature forming at 160° C. or higher, the polycarbonate polyurethane resin should have a 100% modulus of 20 kgf/cm² or more. When the 100% modulus is less than 20 kgf/cm², the skin sheet is likely to be thermally fused to each other when formed or embossed, leading to uselessness.

Preferred polycarbonate polyurethane resins can be represented by the general formula —[—[R¹—O—(CO)—O—]$_n$—R¹—O—CONH—R²—NHCOO]$_m$—, wherein R¹ is an alkylene group, R² is a polyisocyanate residual group, n is the integer number of repeating units of —[R¹—O—(CO)—O—]— and m is the integer number of repeating units of the basic structure (2) shown below:

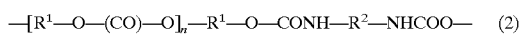
—[R¹—O—(CO)—O]$_n$—R¹—O—CONH—R²—NHCOO—   (2)

The 100% modulus means the tensile modulus measured at the elongation of 100% and the 100% modulus of the polycarbonate polyurethane can be determined at 23±2° C. and 50±5% humidity according to the method described in section 5.3.3 of JIS K 7311 (1995): Testing methods for thermoplastic polyurethane elastomers.

(b) (Meth)acrylate-butadiene-styrene resin (MBS resins)

It should be understood that the term "(meth)acrylates" in the MBS resin includes not only acrylic acid or methacrylic acid but also alkyl acrylates or alkyl methacrylates which (meth)acrylates preferably include methyl (meth)acrylate, ethyl (meth)acrylate, propyl (meth)acrylate, butyl (meth) acrylate, 2-ethylhexyl (meth)acrylate, n-octyl (meth) acrylate, n-dodecyl (meth)acrylate, etc. Among them, methyl methacrylate is preferable. The MBS resins may contain styrene, which may be either unsubstituted styrene or substituted styrene such as α-methyl styrene, etc.

The MBS resins are commercially available as high-temperature processing aids for polyvinyl chloride products, particularly as additives for improving tensile strength and rupture elongation at high temperatures, for instance, Methabrene P-500, C-301, etc., of Mitsubishi Rayon. Such commercially available products may be used for the present invention.

(c) Weight ratio

The amount of the MBS resin is 0.1–40 parts by weight per 100 parts by weight of the polycarbonate polyurethane resin. When the amount of the MBS resin is less than 0.1 parts by weight, cracking takes place in the topcoat layer by thermal stretching of 150% or more at 160° C. Also, when the amount of the MBS resin exceeds 40 parts by weight, the skin sheet rather has poor thermal stretching, whereby the topcoat layer undergoes cracking by thermal stretching of 150% or more at 160° C. The preferred amount of the MBS resin is 1–10 parts by weight.

(II) Second embodiment

The topcoat of the second embodiment may be made of polyesters, acrylic resins, polyisocyanates, etc.

Polyesters have basic structures of polyvalent alcohols and polyvalent acids or their anhydrides. The polyvalent alcohols may be ethylene glycol, diethylene glycol, polyethylene glycol, propylene glycol, dipropylene glycol, polypropylene glycol, etc The polyvalent acids or their anhydrides include phthalic acid, phthalic anhydride, isophthalic acid, isophthalic anhydride, maleic acid, maleic anhydride, fumaric acid, itaconic acid, etc. The polyesters may be alkyds or polyarylates.

The acrylic resins may be polymers of (meth)acrylates such as methyl (meth)acrylate, ethyl (meth)acrylate, propyl (meth)acrylate, butyl (meth)acrylate, etc., or copolymers of such (meth)acrylates with styrenes such as styrene, a-methyl styrene, etc., and/or carboxylic acids such as carboxylic acids such as (meth)acrylic acid, crotonic acid, itaconic acid, fumaric acid, maleic acid, etc.

The polyisocyanates may be aliphatic polyisocyanates such as bexamethylene diisocyanate (HMDI); alicyclic polyisocyanates such as isophorone diisocyanate (IPDI); aromatic polyisocyanates such as hydrogenated diphenyl diisocyanate, diphenylmethane4,4'-diisocyanate (MDI), hydrogenated MDI, etc.

(2) Thickness

The thickness of the topcoat is in general preferably 3–20 μm, more preferably 5–15 μm. When it is less than 3 μm, embossing such as satin-embossing, etc. cannot well be conducted, and the topcoat of more than 20 μm in thickness cannot be formed by one coating step.

[2] Method of production (A) Production of thermoplastic sheet

The thermoplastic polyolefin resin or the thermoplastic elastomer is melt-blended and formed into a sheet by extrusion or calendaring. Prior to coating a primer, the thermoplastic sheet is preferably heat-treated or irradiated with ultraviolet rays for cross-lining. Cross-linking imparts good heat resistance, durability, wear resistance, etc. to the thermoplastic sheet without losing softness.

(B) Coating of primer and topcoat

The thermoplastic polyolefin or elastomer sheet can be coated with a primer and a topcoat by known methods such as a roll coating method, a spraying method, etc.

(C) Embossing

To provide the topcoat layer with a matte surface or a leather-like pattern, embossing is preferably conducted. The embossing temperature is 190° C. or higher, preferably 190–240° C., particularly 190–210° C. at a surface of the topcoat.

(D) Vacuum forming

The thermoplastic skin sheet of the present invention, which is suitable for interior parts such as instrument panels, etc., is formed into desired shapes by vacuum forming. First, a polypropylene foam layer is sandwiched by a polypropylene substrate sheet and the desirably embossed thermoplastic skin sheet, and the resultant laminate is disposed in a vacuum die. While evacuating the die from the side of the skin sheet, the laminate is thermally formed into a desired shape. The preferred vacuum forming temperature is about 160° C.

The present invention will be described in detail below referring to the following examples, without intention of restricting the scope of the present invention defined by the claims attached hereto. In EXAMPLES and COMPARATIVE EXAMPLES, the following materials were used.

(1) Thermoplastic elastomer sheet

Thermoplastic elastomer sheet (blend of polypropylene/olefinic elastomer) having a thickness of 0.6 mm and MFR (230° C., 2.16 kg load, JIS K7210) of 1.04 g/10 min. When a reactive primer was coated, a sheet surface was subjected to a corona discharge treatment in advance to adjust a surface wetting index to 54 dyn/cm.

(2) Primer and coating method

AD456M One-liquid-type primer of modified polypropylene free from chlorine (carboxyl group content: 1.0 mg-equivalent/g, manufactured by Tokushu Shikiryo Color & Chemicals, Inc.)

AD-479 Chlorinated polypropylene primer (manufactured by Tokushu Shikiryo Color & Chemicals, Inc.)

AD-180 Saturated polyester primer (manufactured by Tokushu Shikiryo Color & Chemicals, Inc.)

L4001 Chlorinated polypropylene primer (manufactured by Tokushu Shikiryo Color & Chemicals, Inc.)

UA-63 Polyisocyanate (manufactured by Tokushu Shikiryo Color & Chemicals, Inc.)

AD-180-9/UA-63 Two-liquid, reaction-type primer of saturated polyester/polyisocyanate (weight ratio of AD-180-9/UA-63: 100/3, manufactured by Tokushu Shikiryo Color & Chemicals, Inc.)

Coating method One-step coating by a 120-mesh gravure roll coater (coating amount on a wet basis: 18–22 g/m$^2$)

(3) Topcoat and coating method

EK-167 Topcoat paint comprising a saturated polyester, an acrylic resin and polyvinyl chloride (weight ratio: 30/60/10, manufactured by Tokushu Shikiryo Color & Chemicals, Inc.)

EK-167/UA-63 Two-liquid, reaction-type topcoat paint comprising [saturated polyester+acrylic resin+polyvinyl chloride]/polyisocyanate EK-167/UA-63: 100/3, manufactured by Tokushu Shikiryo Color & Chemicals, Inc.)

HST-220 Polyurethane topcoat paint (100% modulus of resin; 100 kgf/cm$^2$, manufactured by Tokushu Shikiryo Color & Chemicals, Inc.)

EU470 Polyurethane topcoat paint (100% modulus of resin: 40 kgf/cm$^2$, manufactured by Tokushu Shikiryo Color & Chemicals, Inc.)

EU-105M Polyurethane topcoat paint (100% modulus of resin: 60 kgf/cm$^2$, manufactured by Tokushu Shikiryo Color & Chemicals, Inc.)

EU-1000 Polyurethane topcoat paint (manufactured by Tokushu Shikiryo Color & Chemicals, Inc.)

PEX5-12 Topcoat paint of polycarbonate polyurethane resin (100% modulus of resin: 30 kgf/cm$^2$, manufactured by Tokushu Shikiryo Color & Chemicals, Inc.)

PE62-31 Polyurethane topcoat paint (manufactured by Tokushu Shikiryo Color & Chemicals, Inc.)

Coating method No. 40 bar coat method (coating amount on a wet basis: 15 g/m$^2$), or spraying method (coating amount on a wet basis: 100–150 g/m$^2$).

EXAMPLE 1

Each of the above thermoplastic elastomer sheets was coated with a primer (AD-456M) based on modified polypropylene free from chlorine in an amount of 15 g/m$^2$ on a wet basis, dried and then coated with a topcoat, which was a mixture of a topcoat paint (PEX5-12) comprising 100 parts by weight of a polycarbonate polyurethane resin having a number-average molecular weight of 11,300 and a 100% modulus of 30 kgf/cm$^2$, and 0–100 parts by weight of an MBS resin. Each of the resultant skin sheets (Samples 1–16) was thermally stretched at 160° C., to test and evaluate cracking on a sample surface according to the following method and standards. The results are shown in Table 1.

(1) Thermal stretching test method

Heating means and temperature: Infrared heater (highest: 160° C.)

Monoaxial stretching rate: 50% (1.5 times), 100% (2 times), 150% (2.5 times), 200% (3 times), 250% (3.5 times), and 300% (4 times).

(2) Evaluation standards

◎: No cracks were appreciated by microscopic observation.

○: Less than 10, on average, cracks of 10 μm or less in length were appreciated in a field of 40 mm$^2$ by microscopic observation, though no cracks were appreciated by the naked eye observation.

Δ: Cracks exceeding the range of ○ was appreciated by microscopic observation.

X: Cracks were clearly appreciated by the naked eye observation.

XX: A sheet surface was damaged by cracking.

TABLE 1

| Sample No. | 1 | 2 | 3 | 4 | 5 | 6 | 7 | 8 |
|---|---|---|---|---|---|---|---|---|
| Primer | | | | AD-456M | | | | |
| Topcoat | | | | PEX5-12 | | | | |
| Amount of MBS (phr) | 0 | 0.1 | 0.2 | 0.3 | 0.4 | 0.5 | 1 | 3 |
| Results of Thermal stretching Test | | | | | | | | |
| 50% | ○ | ○ | ○ | ◎ | ◎ | ◎ | ◎ | ◎ |
| 100% | ○ | ○ | ○ | ◎ | ◎ | ◎ | ◎ | ◎ |
| 150% | Δ | ○ | ○ | ◎ | ◎ | ◎ | ◎ | ◎ |
| 200% | X | X | ○ | ○ | ○ | ◎ | ◎ | ◎ |
| 250% | X | X | Δ | Δ | Δ | ○ | ○ | ○ |
| 300% | X | X | Δ | Δ | Δ | Δ | ○ | ○ |

TABLE 1 (continued)

| Sample No. | 9 | 10 | 11 | 12 | 13 | 14 | 15 | 16 |
|---|---|---|---|---|---|---|---|---|
| Primer | | | | AD-456M | | | | |
| Topcoat | | | | PEX5-12 | | | | |
| Amount of MBS (phr) | 5 | 10 | 15 | 20 | 30 | 40 | 50 | 100 |
| Results of Thermal stretching Test | | | | | | | | |
| 50% | ◎ | ◎ | ◎ | ◎ | ◎ | ◎ | ◎ | XX |
| 100% | ◎ | ◎ | ◎ | ◎ | ○ | ○ | ○ | XX |
| 150% | ◎ | ◎ | ◎ | ○ | ○ | ○ | Δ | XX |
| 200% | ◎ | ◎ | ○ | ○ | Δ | Δ | Δ | XX |
| 250% | ◎ | ○ | ○ | ○ | Δ | Δ | Δ | XX |
| 300% | ◎ | ○ | Δ | Δ | Δ | Δ | Δ | XX |

It is clear from the results of Table 1 that significant improvement (thermal stretching of 150% or more) started to appear from the addition of 0.1 parts by weight of the MBS resin (Sample 2) and was kept until the addition of 40 parts by weight of the MBS resin (Sample 14). However, when 50 parts by weight of the MBS resin (Sample 15) was added, such effects disappeared. Also, in the case of 100 parts by weight of the MBS resin (Sample 16), stretchability rather deteriorated. Minimum stretching necessary for producing interior parts of automobiles is usually about 150% (about 2 times stretching), and the amount of the MBS resin necessary for achieving this stretching is in a range from 0.1 parts by weight (Sample 2) to 40 parts by weight (Sample 14). Further, for formed products subjected to 300% stretching (4 times stretching), the amount of the MBS resin is desirably from 1 parts by weight (Sample 7) to 10 parts by weight (Sample 10).

COMPARATIVE EXAMPLE 1

Each of the same thermoplastic elastomer sheets as used in Example 1 was coated with a commercially available chlorinated polypropylene primer (L-4001, Sample 17), a reactive primer of saturated polyester and polyisocyanate (AD-180-9/UA-63:100/3, Sample 18), or a primer based on modified polypropylene free from chlorine (AD-456M, Sample 19). None of the sheets was coated with a topcoat. The resultant Samples 17–19 were thermally stretched at 160° C. to evaluate cracking on the surface in the same manner as in EXAMPLE 1. The results are shown in Table 2.

TABLE 2

| Sample No. | 17 | 18 | 19 |
|---|---|---|---|
| Primer | L-4001 | AD-180-9/UA-63 | AD-456M |
| Topcoat | — | — | — |
| Results of Thermal stretching Test ||||
| 50% | ◎ | Δ | ◎ |
| 100% | ◎ | XX | ◎ |
| 150% | ◎ | XX | ◎ |
| 200% | ◎ | XX | ◎ |
| 250% | ◎ | XX | ◎ |
| 300% | ◎ | XX | ◎ |

It is clear from Table 2 that thermal stretching at 160° C. was fully followed in the case of the chlorinated polypropylene primer (Sample 17) and the modified polypropylene free from chlorine (Sample 19), and that thermal stretching was not substantially followed without causing cracking and rupture in the case of the two-liquid, reaction-type primer (Sample 18).

COMPARATIVE EXAMPLE 2

Each of the same thermoplastic elastomer sheets as used in Example 1 was coated with a commercially available chlorinated polypropylene primer (L-4001). After drying, a commercially available topcoat was applied to each sheet. Each of Samples was thermally stretched at 160° C. to evaluate cracking on the surface in the same manner as in EXAMPLE 1. The results are shown in Table 3.

TABLE 3

| Sample No. | 20 | 21 | 22 | 23 |
|---|---|---|---|---|
| Primer | L-4001 ||||
| Topcoat | EK-167 | EK-167/UA-63 | HST-220 | EU-470 |
| Amount of MBS (phr) | 0 | 0 | 0 | 0 |
| Results of Thermal stretching Test |||||
| 50% | X | XX | ○ | XX |
| 100% | XX | XX | X | XX |
| 150% | XX | XX | XX | XX |
| 200% | XX | XX | XX | XX |
| 250% | XX | XX | XX | XX |
| 300% | XX | XX | XX | XX |

It is clear from Table 3 that when a commercially available saturated polyester/acrylic resin topcoat (Sample 20), a mixture of this commercially available saturated polyester/acrylic resin topcoat with polyisocyanate (Sample 21), or a polyurethane topcoat (Sample 22 or 23) was used, the resultant skin sheet was unsuitable for thermal forming, even if a chlorinated polypropylene primer (L-4001) was used. Incidentally, when a topcoat (HST220) of high-modulus polyurethane (100% modulus: 100 kgf/cm$^2$) was used (Sample 22), 50% stretching (1.5 times stretching) could be achieved without causing any damage, though further damage-free stretching was not obtained, meaning that it could not be used for usual forming applications.

COMPARATIVE EXAMPLE 3

Each of the same thermoplastic elastomer sheets as used in Example 1 was coated with a primer of modified polypropylene free from chlorine (AD-456M). After drying, various commercially available topcoats were applied to sheets. Each of Samples was thermally stretched at 160° C. to evaluate cracking on the surface in the same manner as in EXAMPLE 1. The results are shown in Table 4.

TABLE 4

| Sample No. | 24 | 25 | 26 | 27 | 28 | 29 |
|---|---|---|---|---|---|---|
| Primer | AD-456M ||||||
| Topcoat | EK-167 | EK-167/UA-63 | HST-220 | EU-470 | EU-105M | PEX5-12 |
| Amount of MBS (phr) | 0 | 0 | 0 | 0 | 0 | 0 |
| Results of Thermal stretching Test |||||||
| 50% | X | XX | ○ | XX | XX | ○ |
| 100% | XX | XX | X | XX | XX | ○ |
| 150% | XX | XX | XX | XX | XX | Δ |
| 200% | XX | XX | XX | XX | XX | X |
| 250% | XX | XX | XX | XX | XX | X |
| 300% | XX | XX | XX | XX | XX | X |

It is clear from Table 4 that when a commercially available topcoat (Samples 24–27) containing no MBS resin was used, the resultant skin sheet failed to show practically useful thermal stretchability, even if a primer of modified polypropylene free from chlorine (AD-456M) was used. It was also found that when a topcoat (EU105M) of polyurethane (100% modulus; 60 kgf/cm$^2$) was used (Sample 28), the skin sheet was not used for thermal forming at 160° C. In the case of Sample 29 in which a topcoat (PEX5-12) of polyurethane having 100% modulus of 30 kgf/cm$^2$ was used, the skin sheet was useable without damage only until 100% stretching (2 times stretching), failing to show further damage-free stretching.

EXAMPLE 2

Each of the above thermoplastic elastomer sheets was coated with a primer (AD-456M) mainly comprising modified polypropylene free from chlorine in an amount of 18–22 g/m$^2$ on a wet basis, dried and then coated with each of the above topcoat paints by a spraying method in an amount of 100–150 g/m$^2$ on a wet basis. After drying, each of the resultant skin sheets (Samples 30–32) was embossed at 200° C., to test and evaluate adhesion, solvent resistance and thermal discoloration resistance according to the following method and standards. The results are shown in Table 5.

(1) Adhesion

A surface of a topcoat layer of each sample was cut by a stainless steel cutter in a 10×10 chessboard pattern (100 units) at an interval of 2 mm according to JIS D202. After fully pressing a cellophane tape (Nichiban LP24, available from Nichiban) onto a cut surface of the topcoat layer by a roller, the cellophane tape was rapidly peeled from a surface of the topcoat layer to count the number of the remaining chessboard units. The adhesion is represented by a ratio of the number of the remaining chessboard units to 100.

(2) Solvent resistance

A polypropylene foam sheet (15025, manufactured by Toray, Ltd.) of 3 cm in width and 20 cm in length was placed in a Gakushin-type rubbing tester II according to JIS L0823, and each sample of the same size was set with the topcoat side upward on the polypropylene foam sheet. A rubbing element (white degreased flannel of 2 cm in width and 4 cm in length impregnated with a test solvent of white gasoline and toluene at a weight ratio of 9:1) was set on the sample, and moved back and forth 20 cycles at a speed of one cycle/2 seconds under the conditions of 25° C. and a load of 200 g. After leaving the sample for 30 minutes or more, the rubbed surface of the sample was observed by the naked eye and by a 10-magnification lens.

(3) Thermal discoloration resistance

Each sample was attached with its topcoat surface outside to a polypropylene foam sheet (15025, manufactured by Toray, Ltd.), and dangled vertically in a gear oven. While rotating the sample, it was heated at 120° C. for 300 hours. After heating, the topcoat surface was measured with respect to tristimulus values X, Y and Z according to a yellowness measuring method (JIS K7103) by a differential colorimeter with a C light source at 2° view. The yellowness index representing thermal discoloration resistance was calculated from X, Y and Z by the following formula:

Yellowness index $(YI)=100(1.28X-1.06Z)/Y$,

Yellowing factor $(\Delta YI)=YI_{300}-YI_0$,

Wherein $YI_{300}$=yellow index after test, and
$YI_0$=yellow index before test.

TABLE 5

| Sample No. | 30 | 31 | 32 |
|---|---|---|---|
| Primer | AD-456M | AD-456M | AD-456M |
| Topcoat | EK-467 | EU-1000 | PEX62-31 |
| Corona Discharge Treatment | No | No | No |
| Adhesion | 100/100 | 100/100 | 100/100 |
| Solvent Resistance | ○ | ○ | ○ |
| Thermal Disoration Resistance | 5.38 | 2.54 | 3.51 |

As is clear from Table 5, any samples were free from problems in adhesion and solvent resistance. With respect to thermal discoloration resistance, Samples 31 and 32 coated with a polyurethane topcoat less susceptible to thermal discoloration are fully resistant to thermal discoloration for practical applications Sample 30 coated with a topcoat comprising saturated polyester, an acrylic resin and polyvinyl chloride was slightly discolored than polyvinyl chloride, though the level of discoloration thereof was less than that when chlorinated polypropylene was used. Thus, the thermal discoloration resistance of Sample 30 was considered on an acceptable level for practical applications.

The above data have verified that a skin sheet formed by coating a thermoplastic elastomer sheet with a primer based on modified polypropylene free from chlorine and a topcoat, and embossing at 190–210° C. are much superior to conventional thermoplastic elastomer sheets coated with chlorinated polypropylene-based primers in properties and ease to use.

COMPARATIVE EXAMPLE 4

EXAMPLE 2 was repeated except for using commercially available primers to prepare skin sheets (Samples 33–40). The resultant Samples 33–40 were evaluated in the same manner as in EXAMPLE 2 with respect to adhesions solvent resistance and thermal discoloration resistance. The results are shown in Table 6.

TABLE 6

| Sample No. | 33 | 34 | 35 | 36 |
|---|---|---|---|---|
| Primer | AD-479 | AD-479 | AD-180/ UA-63 | AD-180/ UA-63 |
| Topcoat | EK-167 | EU-1000 | EK-167 | EK-167 |
| Corona Discharge Treatment | No | No | Yes | Yes |
| Adhesion | 100/100 | 100/100 | 100/100 | 0/100 |
| Solvent Resistance | XX | X | ○ | — |
| Thermal Discoloration Resistance | 8.48 | 6.82 | 6.71 | — |

TABLE 6
(Continued)

| Sample No. | 37 | 38 | 39* | 40 |
|---|---|---|---|---|
| Primer | AD-180/ UA-63 | AD-180/ UA-63 | AD-180/ UA-63 | AD-180/ UA-63 |
| Topcoat | EK-167 | EU-1000 | EU-1000 | EU-1000 |
| Corona Discharge Treatment | No | Yes | Yes | No |
| Adhesion | 0/100 | 100/100 | 0/100 | 0/100 |
| Solvent Resistance | — | ○ | — | — |
| Thermal Discoloration Resistance | — | 1.13 | — | — |

Note *: After mixing two liquids of primer, the primer was left at 25° C. for 7 days and then coated.

As is clear from Table 6, Samples 33 and 34 using a chlorinated polypropylene primer were extremely poor in resistance to hydrocarbon solvents and thermal discoloration resistance, though they were satisfactory in adhesion. Thus, Samples 33 and 34 were unsatisfactory for practical applications. Also, it is clear from Samples 37 and 40 that the reactive primer does not have adhesion to the thermoplastic elastomer sheet at all, unless the corona discharge treatment is carried out. Further, it is clear from Samples 36 and 39 that the reactive primer left at 25° C. for 7 days after mixing its two liquids does not well adhere to the thermoplastic elastomer sheet, even if the sheet is subjected to a corona discharge treatment. In only Samples 35 and 38 coated with a reactive primer immediately after corona discharge treatment, good adhesion and solvent resistance are obtained. However, when mixtures of saturated polyesters, acrylic resins and polyvinyl chloride resins are used, extreme thermal discoloration takes place, as is clear from Sample 35.

Thus, in the case of using the reactive primer, it is necessary to control the storing temperature and time of the reactive primer even if a corona discharge treatment is carried out, and the choice of the topcoat paints is restricted.

As described above in detail, because the thermoplastic skin sheet of the present invention is formed by coating a thermoplastic sheet made of a thermoplastic polyolefin resin or a thermoplastic elastomer with a primer of modified polypropylene free from chlorine and a topcoat paint of a polycarbonate polyurethane resin (number-average molecular weight: 8,000 or more, 100% modulus: 20 kgf/$^2$ or more) containing an MBS resin, it shows excellent thermal stretch formability, causing substantially no cracking and rupture on the surface even at thermal stretching of 150% or more.

Further, because the thermoplastic elastomer sheet is coated with a primer based on a modified polyolefin resin having a hydroxyl group or a carboxyl group and embossed, the topcoat is completely fused to the thermoplastic elastomer sheet via the primer layer. Thus, a surface oxidation treatment such as corona discharge treatment, etc. is not necessary on the thermoplastic elastomer sheet before coating the primer.

Also, because any layers do not contain chlorine, the finished skin sheets are free from thermal discoloration, showing excellent solvent resistance and recyclability.

What is claimed is:

1. A thermoplastic skin sheet comprising a thermoplastic sheet made of a thermoplastic polyolefin resin or a thermoplastic elastomer, a modified polyolefin primer layer free from chlorine coated on said sheet, and a topcoat layer coated on said primer layer, said topcoat layer mainly comprising (a) 100 parts by weight of a polycarbonate polyurethane resin having a number-average molecular weight of 8,000 or more and a 100% modulus of 20 kg/cm$^2$ or more, and (b) 0.1–40 parts by weight of a (meth)acrylate-butadiene-styrene resin.

2. The thermoplastic skin sheet according to claim 1, wherein said primer is based on a modified polyolefin resin containing 2 mg-equivalent/g or less of a hydroxyl group or a carboxyl group.

3. The thermoplastic skin sheet according to claim 1, wherein said thermoplastic sheet is made of a thermoplastic elastomer comprising crystalline polypropylene and an olefinic elastomer.

4. The thermoplastic skin sheet according to claim 1, wherein said polycarbonate polyurethane resin is represented by the general formula —[—[—R$^1$—O—(CO)—O—]$_n$—R$^1$—O—CONH—R$^2$—NHCOO]—$_m$ (1), wherein R$^1$ is an alkylene group, R$^2$ is polyisocyanate residual group, n is the integer number of repeating units of —[R$^1$—O—(CO)—O—]— and m is the integer number of repeating units of the basic structure (2) shown below:

—[R$^1$—O—(CO)—O]$_n$—R$^1$—O—CONH—R$^2$—NHCOO— (2), wherein R$^1$, n and R$^2$ are as earlier defined.

5. The thermoplastic skinsheet according to claim 1, wherein, said (meth)acrylate-butadiene-styrene resin imparts mechanical strength and elasticity to said thermoplastic skin sheet, whereby less than 10 cracks of 10 $\mu$m or less in length will be observed in a field of 40 mm$^2$ upon microscopic observation when a skin sheet containing said (meth)acrylate-butadiene-styrene resin is subjected to thermal stretching at 160° C. using thermal stretching of 150% or more.

* * * * *